July 12, 1960
G. E. COLBY
2,944,843
SPRING LOADED SEAL
Filed Aug. 8, 1957
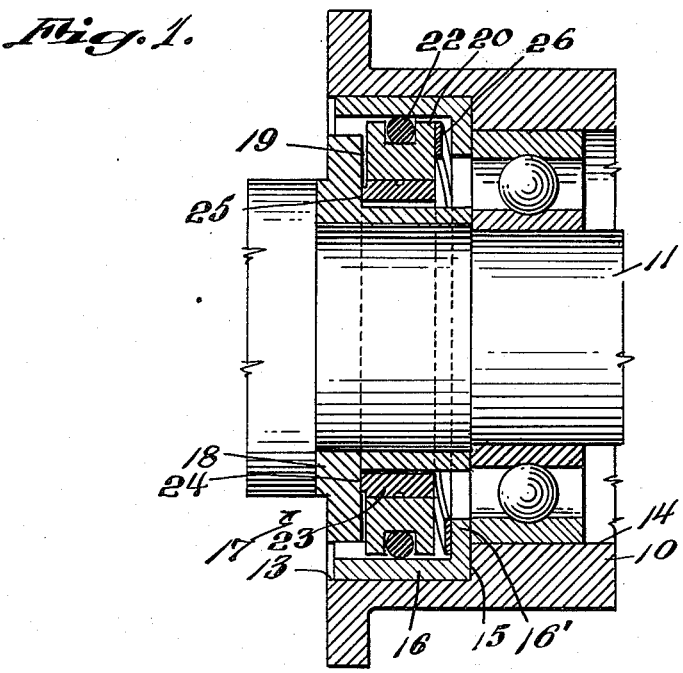
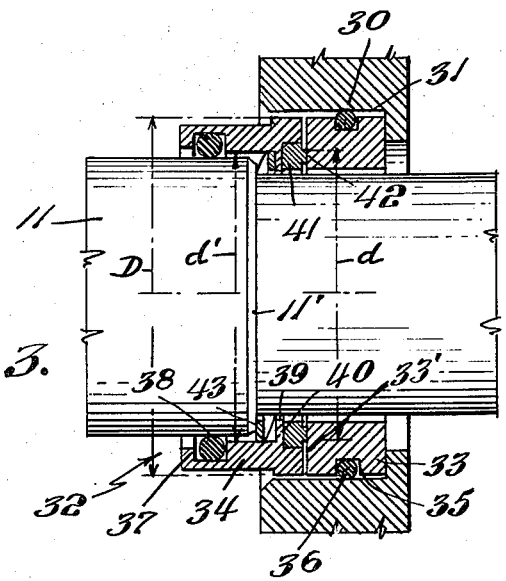
INVENTOR.
George E. Colby
BY
Barlow & Barlow
ATTORNEYS.

United States Patent Office 2,944,843
Patented July 12, 1960

2,944,843

SPRING LOADED SEAL

George E. Colby, Barrington, R.I., assignor to Magnetic Seal Corp., a corporation of Rhode Island Filed Aug. 8, 1957, Ser. No. 677,075

4 Claims. (Cl. 286—11.14)

This invention relates to a spring loaded seal in which a spring is exerting a force against the sealing surface.

Seals of this general type have been known in the prior art, but have exhibited some disadvantages when used in certain environments. It is known that seals are used with rotating members such as shafts which are in turn cross connected to some form of machinery. Every form of machinery has certain types of vibrations present therein. It stands to reason, therefore, that the seal is subjected to the same vibrations that occur in the machine; and inasmuch as there is a spring force present in the seal construction, the vibration will be transmitted to this spring. It is well known that if a mass M is mounted on a spring having a spring constant K (force per unit deflection) and if the mass is displaced either upward or downward and then released, it will oscillate about its position of equilibrium. The frequency of this oscillation expressed as $F_n$ is called the natural frequency of the mass on the spring and is given by the equation $$F_n = \frac{1}{2\pi}\sqrt{\frac{K}{M}}$$

where $F_n$ is the natural frequency expressed in cycles per second, K is the spring constant or force per unit deflection of the spring expressed in poundals per foot deflection, and M is the mass in pounds.

Theoretically, if the vibrations from the machine are impressed upon the mass of a spring loaded seal and allowed to work in a free system, which is the ideal case, the mass will vibrate forever. Of course, this never occurs in nature for all free vibrations die down in time, due to some form of damping. With any form of damping, however, it will be apparent that the spring will undergo quite a few excursions unless what is known as critical damping is reached. Critical damping may usually be described as the phenomena in which when a force is applied to the mass, the spring will not undergo an excursion that carries it beyond the equilibrium point. Critical damping has been expressed mathematically as being equal to $$2_n\sqrt{\frac{K}{M}} = 2\sqrt{MK}$$

It is further known that any material that undergoes vibratory excursions will fatigue after a certain number of these excursions, that is, after a certain number of excursions have taken place in any material, such as metal, the crystalline structure of the metal will change considerably to develop lines of less adhesion from one crystal interface to the other. It is desirable, therefore, to completely reduce this fatigue in a seal of the general form described above, and thus we are concerned with critically damping a spring loaded seal by exerting upon the spring in some manner a force which will give us critical damping. In accordance with the present invention, the critical damping is effected by a magnetic force exerted on the seal, the magnetic force being sufficient to obtain our critical damping heretofore mentioned.

It is, therefore, an object of this invention to construct a spring loaded seal having critical damping.

A further object of the invention is to construct a seal in which there are two relatively rotating parts that are spring loaded and in which an additional force is exerted upon the seal between the stator and rotor that will give us a critical damping factor for the spring.

With these and other objects in view, the invention consists of certain novel features of construction, as will be more fully described and particularly pointed out in the appended claims.

In the drawings:

Fig. 1 is a sectional view taken through a seal of the general type described;

Fig. 2 is a sectional view of the spring utilized in this construction;

Fig. 3 is a sectional view showing a modified form of a seal of the general construction referred to; and Fig. 4 is an edge view of a modified form of spring.

Referring now to the drawings, 10 designates generally a housing in which a fluid is to be sealed against escape about a rotary shaft 11 which passes therethrough. This housing is preferably constructed of a material which does not exhibit magnetic properties, such as non-magnetic stainless steel, and is provided with a bore 13 therethrough which has a reduced section 14 thereof providing a shoulder 15 extending in a plane at right angles to the axis of the bore. Within the bore 13, there is provided a ring 16 having a lip 16' which abuts the shoulder 15, the entire ring being held stationary with respect to the housing 10. Within this ring 16, there is received a rotary seal designated generally 17.

The rotary seal comprises a collar 18 which is attached to the shaft 11 and is provided with a sealing surface 19. The sealing surface 19 extends in a plane at right angles or normal to the axis of the shaft 11 and is machined to within $23.2 \times 10^{-6}$ inch or 2 helium bands flat as viewed with an optical flat under a monochromatic light source. Co-operating with the collar 18 is a ring part 20 which surrounds the shaft 11 in spaced relation thereto and is preferably made from a permanent magnetic alloy such as "Alnico V," which alloy consists of aluminum, cobalt, copper and iron materials. The part 20 has an annular groove 21 in which is received an O-ring gasket 22 that abuts the ring 16 to effect a fluid tight seal between the ring 16 and the part 20. The part 20 has affixed thereto in its inner diameter a carbon ring 23 which has an annular lip 24 provided with a sealing surface 25 that abuts the sealing surface 19 by the force of the spring 26. The spring 26 preferably takes a ring formation having an undulated surface, the undulations abutting against the lip 16' of the ring 16 and the part 20. The ring part 20 and its carbon ring 25 are effectively stationary with respect to the housing 10 and the ring 16. Fluid entering the housing 10 from the right hand side, as viewed in the drawing, is blocked from escape therefrom by the O-ring seal 22 and the seal between the faces 19 and 25.

Inasmuch as the part 20 is made from magnetic material as noted above, the force of this magnet may be defined with respect to the collar 18 so that it is ineffective to provide a tight seal between the surfaces 19 and 25. Spring 26, therefore, provides the actual force to effect the seal but in practice, this force has been found to give uneven pressure; and further, the spring under certain vibration conditions will tend to resonate and exhibit a deflection which is variable. The magnetic ring 20 in this case tends to dampen these vibrations and exerts a sufficient pull toward rotor 18 to provide the critical damping of the spring 26.

Referring to Fig. 3, I have shown a modified form of a seal which is particularly adapted to be utilized where a balanced seal is desired. This seal arrangement consists of a housing 30 having a bore 31. A rotary seal designated generally 32 is received within the bore 31 and has a part 33 in the form of a ring which is held stationary with respect to the housing 30 and which has an inner bore spaced from shaft 11. Part 33 is formed with an annular groove 35 that receives an O-ring 36, the O-ring forming a fluid tight seal between the bore 31 and the part 33. The part 33 comprises a magnetic ring which is made of a magnetic alloy such as "Alnico V." A steel collar 34 is provided with a groove 37 which receives an O-ring 38 to form a fluid tight seal between the shaft 11 and the collar 34. An annular lip 39 extends from the collar 34 and forms on one side thereof a recess 40 that receives a carbon ring insert 41 which is provided with a sealing surface 42. In this particular embodiment, the shaft 11 is reduced and thereby forms a shoulder 11'. Between the lip 39 and this shoulder 11', there is received an annular spring 43 which has an undulated surface so that it abuts the shoulder 11' and the lip 39. This spring thereby forces the part 34 toward the part 33 and provides a sealing surface between the surface 42 of the carbon ring and the surface 33' of the part 33. These sealing surfaces referred to are in a plane at right angles or normal to the axis of the shaft 11 and are machined flat to within $23.2 \times 10^{-6}$ inch. The seal operates in the same manner as the embodiment described above, except in this case the collar 34 is provided with surfaces that are normal to the shaft 11 that in effect provide equal areas in the axial direction of the shaft as viewed from the left or the right, thus effectively placing the part 34 in a fluid equilibrium. The equilibrium is secured by sizing areas as follows: the surface area on member 34 exposed to the pressure of the fluid acting thereon in a direction tending to move the sealing surfaces into engagement is a surface area equal to a surface area of diameter $D$ minus diameter $d'$; the surface area on member 34 exposed to the said fluid pressure acting thereon in a direction tending to move the said sealing surfaces apart is a surface area equal to a surface area of diameter $D$ minus diameter $d$. Thus, since diameter $d$ is made equal to diameter $d'$, the sealing member 34 is in balance to the fluid pressure sealed.

The spring 26 or 43 in cases where there is plenty of axial room may be a wire coil about the shaft several turns in place of the wavy spring of Fig. 2 as seen in Fig. 4 at 45.

I claim:
1. A fluid seal device for effecting a fluid-tight seal between two relatively rotatable members, sealing faces on said members, resilient means urging said faces into sealing engagement, and magnetic means urging said members into sealing engagement, said magnetic means exerting a force sufficient to critically dampen said resilient means and less than the force required to form a fluid tight seal between said faces.

2. A fluid seal device for effecting a fluid-tight seal between a rotatable shaft and a housing therefor, said seal comprising a collar on the shaft and rotatable therewith, said collar having a sealing surface disposed in a plane perpendicular to the axis of the shaft, an annular part surrounding said shaft mounted in said housing in sealing engagement therewith, said annular part having a sealing surface disposed in a plane perpendicular to the axis of the shaft, resilient means holding said annular part against said collar, said annular part being wholly of a magnetized material to be attracted toward said collar, the magnetization force being sufficient to critically damp said resilient means and less than that required to form a fluid tight seal between said surfaces.

3. A fluid seal device as in claim 1 wherein said resilient means is an annular undulated spring.

4. A fluid seal device as in claim 1 wherein said resilient means is an annular coiled spring.

References Cited in the file of this patent

UNITED STATES PATENTS

| | | |
|---|---|---|
| 1,339,156 | Beldam | May 4, 1920 |
| 2,365,046 | Bottomley | Dec. 12, 1944 |
| 2,672,357 | Voytech | Mar. 16, 1954 |
| 2,685,463 | Pollard | Aug. 3, 1954 |
| 2,706,652 | Berger | Apr. 19, 1955 |
| 2,738,208 | Mylander | Mar. 13, 1956 |

FOREIGN PATENTS

| | | |
|---|---|---|
| 678,981 | Great Britain | Sept. 10, 1952 |